United States Patent [19]

Rigdon et al.

[11] Patent Number: 4,655,384

[45] Date of Patent: Apr. 7, 1987

[54] METHOD OF FABRICATING FIBER-REINFORCED METAL COMPOSITES

[75] Inventors: Michael A. Rigdon, Manassas; Clemens F. Zurlippe, Madison Heights, both of Va.

[73] Assignee: The Babcock & Wilcox Company, New Orleans, La.

[21] Appl. No.: 789,209

[22] Filed: Oct. 18, 1985

[51] Int. Cl.$^4$ .............................................. B23K 31/00
[52] U.S. Cl. .................................... 228/132; 228/148; 228/190
[58] Field of Search ............... 228/131, 132, 148, 186, 228/190, 221, 243, 265

[56] References Cited

U.S. PATENT DOCUMENTS

| | | | |
|---|---|---|---|
| 3,095,643 | 7/1963 | Cooke et al. | 228/148 |
| 3,862,489 | 1/1975 | Weisinger | 228/193 |
| 4,454,977 | 6/1984 | Aldinger et al. | 228/131 |
| 4,533,806 | 8/1985 | Kawasaki et al. | 228/131 |

*Primary Examiner*—M. Jordan
*Attorney, Agent, or Firm*—Vytas R. Matas; Robert J. Edwards

[57] ABSTRACT

A method of fabricating a fiber-reinforced metal matrix composite including the steps of mounting of a braided fiber tube on a substrate, wrapping a braze foil about the braided fiber tube to form an assembly that is encapsulated by a metal capsule which is creep collapsed onto the assembly at a temperature below the braze foil flowpoint. The encapsulated assembly is subsequently heated to a temperature sufficient to induce flow of the braze foil alloy and later cooled to allow solidification and annealing of the resulting fiber reinforced metal composite.

8 Claims, 3 Drawing Figures

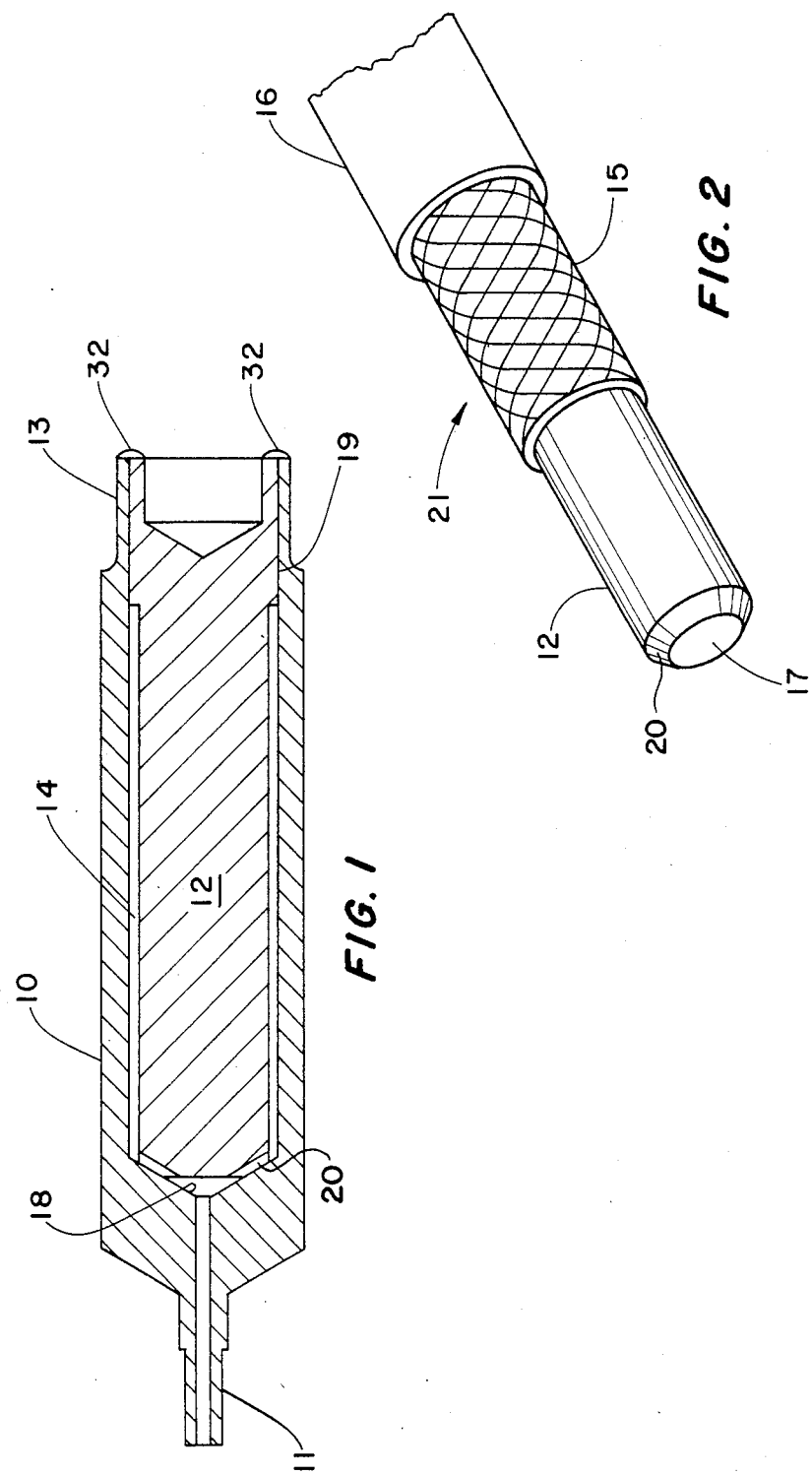

METHOD OF FABRICATING FIBER-REINFORCED METAL COMPOSITES

BACKGROUND OF THE INVENTION

This invention relates to fiber-reinforced composites and, more particularly, to metal matrix composites and a method of fabricating fiber-reinforced metal matrix composites.

Metal Matrix composites hold great promise as materials that can provide improved structural rigidity in components with designs governed by strength to weight ratio considerations or which must retain high elastic modulus values at elevated temperatures.

The application of standard composite fabricating techniques to metal matrix composites is limited by the fact that it is difficult to establish sound solid state bonds between fibers and metal matrices, especially under conditions where the fibers cannot be subjected to stretch deformation.

SUMMARY OF THE INVENTION

Braided fiber sleeving is utilized to provide circular and out-of-round cross sectional tubular metal matrix composites.

In accordance with the invention, a fiber-reinforced metal matrix composite is produced from braided fiber sleeve that is fit over a metal insert that initially acts as a support mandrel. The braided fiber sleeve is then axially tensioned to cause it to come into intimate contact with the insert over the entire length of the sleeve. Each end of the tensioned, braided fiber sleeve is fixedly secured. Next, a braze foil is wrapped around the sleeve. The braze foil is also secured to prevent movement. The assemblage of the insert, braided fiber sleeve and braze foil is inserted into a tubular capsule. The ends of the tubular capsule are sealed and the tubular capsule is evacuated. The evacuated tubular capsule containing the assemblage is subjected to increasing temperature and pressure until the tubular capsule is caused to creep collapse onto the assemblage; the temperatures of the capsule and assemblage, at this stage of the process, is maintained below the braze foil flowpoint. Thereafter, the temperature is raised to a value above the braze foil alloy flowpoint to induce flow of the braze foil alloy and wetting of the composite fibers. After a few minutes, the temperature is lowered to allow solidification and solution-annealing of the resulting fiber reinforced metal composite.

BRIEF DESCRIPTION OF THE DRAWINGS

FIG. 1 is a longitudinal section of a device for bonding the fibers into a metal matrix in accordance with the invention;

FIG. 2 is a perspective view, partly broken away, of a part of a core bearing a braided fiber tube and an outer wrapping of a braze foil.

DETAILED DESCRIPTION

Figure 3:
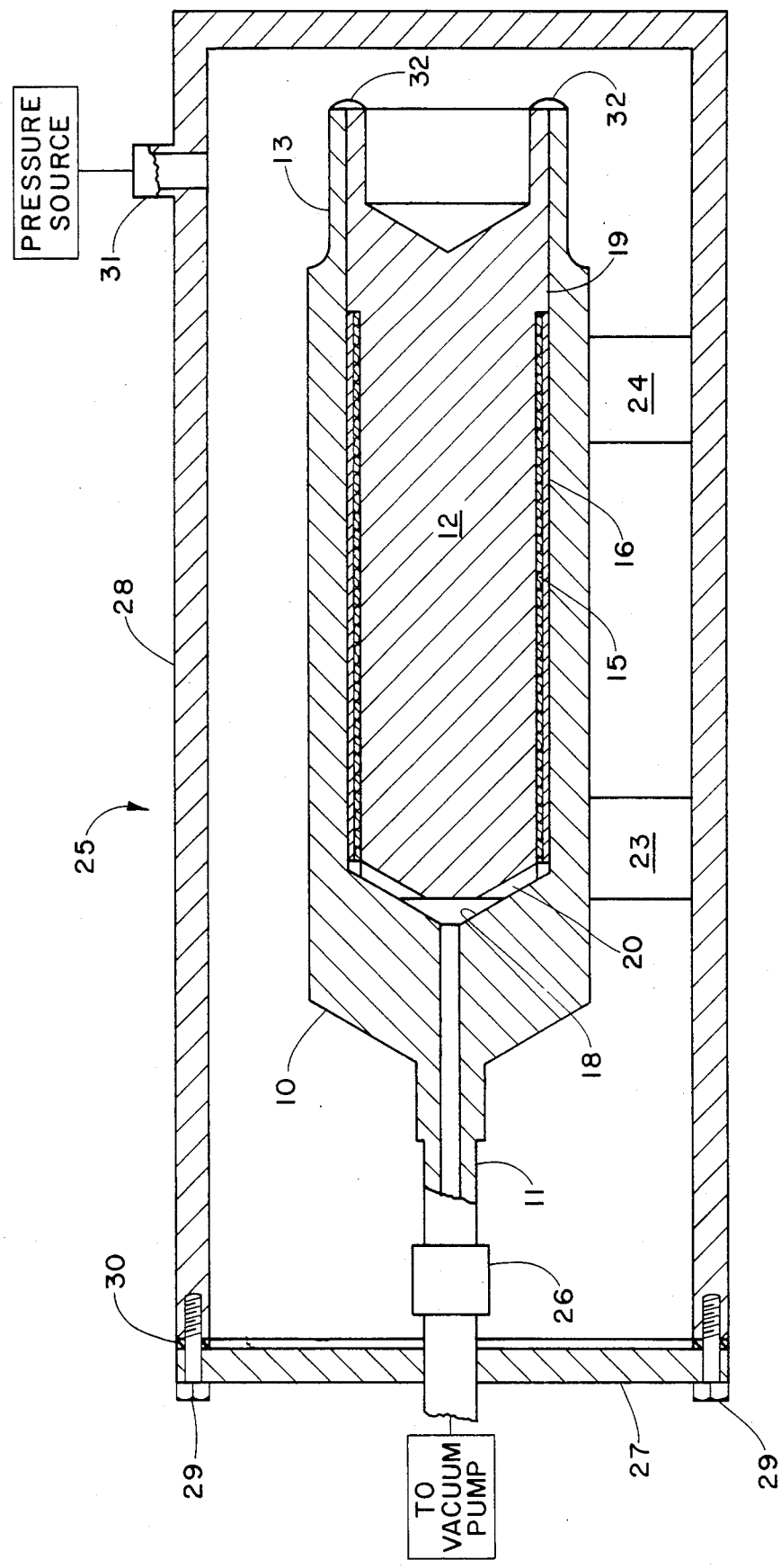
FIG. 3 is a cross-sectional view of a retort containing the device of FIG. 1 with a braided fiber tube and braze foil mounted therein (and shown in a larger scale for clarity of illustration) in preparation for bonding in accordance with the inventive process.

Referring now particularly to FIG. 1 of the drawing, there is shown a bonding device for forming a fiber-reinforced metal composite. The device includes an outer tubular capsule 10 having a generally cylindrical bore extending from a first, open-end portion 11 to a second, cylindrical open-end portion 13. The first end portion 11 provides a suitable connection for connecting the bore to means, such as a vacuum pump, for evacuating the capsule 10 in a well known manner. The open-end of end portion 13 provides a means for insertion of a core or insert 12 which is shown in FIG. 1 inserted into the bore of the capsule 10. The insert 12 is radially spaced from the inner periphery of the capsule so as to form a longitudinal annulus 14. The annulus 14 provides a suitable clearance for accommodating a braided fiber tube 15 and an encapsulating braze foil 16 mounted upon the insert 12 as best shown in FIGS. 2 and 3.

In a preferred design of the bonding device, the insert 12 comprises a solid cylindrical bar provided with a forward chamber 17 which abuts upon a complementary shaped shoulder or wall surface 18 formed within the capsule 10. The rear end of the insert 12 is provided with an outer shoulder 19 designed to tightly engage the inner circumference of the capsule 10. The rear end of the insert 12 is counterbored to provide a thin-walled portion along at least part of the shoulder 19. Vent grooves 20 are provided to facilitate the evacuation of the capsule 10.

In FIG. 2, a preformed braided fiber tube 15 is shown slipped over and mounted onto the insert 12. The braided fiber tube 15 has a loose mesh braid of the type that may be dispensed from a storage roll and slip fitted over the insert 12. A braze foil 16 is wrapped around the braided fiber tube 15 to form an overlying layer to wrap. The insert 12, the braided fiber tube 15 and the braze foil 16 comprise an assemblage, designated generally by reference character 21, which is designed to be closely received within the capsule 10 as best shown in FIG. 3.

FIG. 3 illustrates a retort 25 used for pressure bonding the capsule 10, in accordance with the inventive technique, as described hereinafter. The retort 25 includes two supports or uprights 23, 24 upon which the capsule 10 is carried. The capsule 10 is schematically shown attached to a vacuum pump via a connector 26 mounted in a removable head 27. The head is sealingly fixed to the body 28 of the retort via bolts 29 and a seal 30 in a well-known manner. A connection 31 is provided for pressurizing the retort via an external pressure source. Integral means (not shown) may be provided for heating the retort or the retort itself can be placed in a suitable environment, such as a furnace, to effectuate overall heating of the retort 25, the capsule 10 and the assemblage 21. In accordance with the invention, the braided fiber tube 15 is slipped over the metallic insert 12. The one or both ends of the tube 15 are pulled, for example, both ends are pulled in opposite directions, to apply tension to the fibers of the braided tube and to bring the braid into intimate contact with the insert 12, thereby forming a fiber lay-up for matrix infiltration. In one preferred technique, the ends of the braided fiber tube 15 are pulled so as to protrude beyond the ends of the insert 12 and are then tied to prevent shifting of the tensioned tube 15. The braze foil 16 is subsequently wrapped around the fiber lay-up so as to cover the entire length of the insert 12. The foil 16 is fixedly secured to the insert 12, for example, by capacitance discharge spot welding at intermittent locations. If multiple layer fiber reinforcement is desired, additional layers of braided tube and braze foil may be placed over the initial assemblage 21. The so-formed assemblage 21 is inserted into the capsule 10.

The rear end of the capsule 10 is seal welded to the shoulder of the insert 12, at 32, and then evacuated.

Braze bonding of the capsule 10 and the encapsulated assemblage 21 is accomplished by a three-step heat treatment cycle. First, the temperature is increased and isostatic pressure is applied to creep collapse the outer capsule 10 onto the braid fiber tube 15 and braze foil 16 layer, or multilayers as the case may be, at a temperature below the braze alloy flow point. The temperature is then raised to a higher value to trigger braze alloy flow. The temperature is held at this higher level for a short period of time and then dropped to a lower level for solidification and a final solution/diffusion anneal. Autoclaving is preferred over atmosphere pressure bonding as it accelerates the creep collapse process and thus shortens the overall length of the bond cycle.

Three major factors must be considered in selection of the braze foil alloy. First, the flow point of the braze alloy must be well below the incipient melting point and the grain coarsening range of the metal matrix alloy. Second, the braze foil must contain at least one alloy constituent that promotes wetting of the reinforcing fibers to obtain a bond. Third, the wetting action must be controllable to avoid excessive fiber erosion. If the braze foil does not contain a constituent that will chemically interact to wet the fibers and if the wetting action is not controllable, then the fibers can be precoated.

The inventive process has been successfully demonstrated using Nicalon ® silcon carbide fiber, marketed by the Nippon Carbon Company, Ltd., Japan, having a nominal diameter of 14 to 19 microns, that was thermally treated at 1250° F. for 15 minutes to vaporize a sizing compound. The braze foil utilized to incorporate the SiC fiber between the inner and outer aluminum layers comprised an aluminum brazing sheet composed of outer cladding representing the actual brazing alloy and a core (alloy 3003) that acts as a backing material. The cladding, AWS Class BAlSi-2, has a nominal silicon content of 7.5% and melts in the temperature range of 1070° to 1135° F. Aluminum 6063 was chosen as the capsule and insert material due to its intermediate strength characteristics and its high incipient melting point, which is greater than 1150° F.

The embodiments of the invention in which an exclusive property or privilege is claimed are defined as follows:

1. A method of fabricating a fiber-reinforced metal matrix composite comprising the steps of:
   (a) fitting a braided fiber tube over a metallic core;
   (b) applying tension to bring the tube into contact with the metallic core;
   (c) fixing the tensioned tube in place relative to the core;
   (d) mounting a braze foil around the tube;
   (e) securing the foil;
   (f) inserting the so-assembled assembly of the core, the braided fiber tube and foil into a capsule;
   (g) evacuating the capsule;
   (h) applying increasing temperature and pressure to the capsule to collapse the capsule onto the assembly, the temperature being below the braze foil flowpoint;
   (i) further raising the temperature to induce flow of the braze alloy layer of the braze foil;
   (j) maintaining the raised temperature for a short time; and
   (k) lowering the temperature to a value below the braze foil flowpoint and maintaining said lower temperature to allow solidification and annealing of the resulting fiber reinforced metal composite.

2. The method according to claim 1 wherein the flowpoint of the braze alloy of braze foil is well below the incipient melting point and the grain coarsening range of the metal matrix alloy.

3. The method according to claim 1 wherein the braze foil contains at least one alloy that chemically interacts with the reinforcing fibers to wet the fibers and obtain a bond.

4. The method according to claim 1 wherein the core comprises a bar.

5. The method according to claim 1 wherein the core comprises a tube.

6. The method according to claim 1 wherein the core consists essentially of aluminum.

7. The method according to claim 1 wherein the core consists essentially of an aluminum alloy.

8. The method according to claim 1 wherein the brazing foil consists essentially of aluminum and silicon.

* * * * *